Patented July 13, 1954

2,683,670

UNITED STATES PATENT OFFICE 2,683,670

METALLIZING COMPOSITION FOR ELECTRODE STRUCTURES

David Perlman, New York, N. Y.

No Drawing. Application May 7, 1949, Serial No. 91,943

2 Claims. (Cl. 106—290)

This invention relates to compositions and methods for applying a metallic coating to an electrically non-conductive surface layer of a specially-shaped body on which a self-supporting metallic structure of a desired precisely conforming shape is to be formed by an electrodeposition process. Among the applications requiring the formation of such precisely shaped objects, are metallic dental patterns, models and dies; metal record masters used in the manufacture of phonograph records; precision-shaped metal tubing of the type used in radar wave guides; and like applications where precision forming by electrodeposition is essential.

Among the objects of the invention is a novel silver metallizing powder combined with stearic acid in critical proportions, so that by applying it in dry form to a surface of an electrically non-conductive impression or investment compound, it will readily form in a single application an electrically conductive continuous coating of minute thickness which will serve as an electrically conductive surface base on which a metallic layer of substantial thickness may be deposited by a conventional electrodeposition process; and the process of applying silver powder combined with stearic acid in critical proportion to an electrically non-conductive surface of an impression or investment compound for forming thereon by a simple operation a continuous electrically conductive metallic base coating of desired precisely shaped configuration which will serve as a reliable surface electrode on which a metallic layer of substantial thickness may be built up by a conventional electrodeposition process.

Another object of the invention is a novel electrode holder for holding the object which is to be plated in the plating bath, and providing an electrically conducting connection thereto, without subjecting it to excessive forces that tend to deform and modify its shape, the preservation of which is essential for obtaining the plated product of the desired precise shape.

The foregoing and other objects of the invention will be best understood by the following description of exemplifications thereof.

Although the principles of the invention have many other applications, they will be described in connection with the preparation of a die pattern of a cavity-containing tooth used for producing a gold inlay that will fit precisely the tooth cavity in such manner as to reduce the likelihood of further damage of the tooth, or loosening or loss of the inlay.

The present invention was evolved in an effort to avoid difficulties connected with the production of inlays for tooth cavities by what is known as the "indirect method," widely used by the dental profession. In such indirect method, the dentist makes a tooth impression of the whole tooth and its cavity in a warmed-up plastic impression compound held in a thin band of copper or like metal. From this tooth impression a duplicate or pattern of the impaired tooth, known as the "tooth die" is prepared. From the so obtained tooth die pattern there is produced, with similar impression material, a pattern of the tooth cavity conforming to the shape of the actual tooth cavity as precisely as possible. The so-obtained tooth-cavity pattern is invested with an investment material to produce a corresponding cavity mold. After solidifying the cavity mold, the usually waxlike impression material of the cavity pattern is removed, as by melting and burning it out; and the obtained investment cavity mold is used for casting therein the gold inlay which has to have the desired shape fitting precisely the tooth cavity.

Various compounds are used for making such tooth impressions, to-wit, wax compounds, rubberized compounds, hydrocolloid compounds, plaster of Paris, and the like. Because of their ability to conform precisely to the complicated shape of the tooth cavity, most practically used impression compounds are made of electrically non-conductive thermoplastic compounds, such as wax compounds. In order to produce from such tooth impression a precise metallic die pattern of the tooth, it is essential that the exterior shape of the tooth die pattern be formed along the inner surface of the tooth impression cavity by an electrodeposition process. This in turn requires that the complicated cavity surface of the tooth impression be first surfaced with a thin electrically-conductive metallic coating of minute thickness and capable of serving as a base electrode for electrodeposition thereon of a relatively thick and mechanically strong shell-like surface layer of metal that will serve as the exterior of the desired tooth die pattern.

Unless such tooth die pattern conforms with precise accuracy to the tooth with its cavity, no properly fitting inlay can be produced. In other words, the tooth die pattern must conform with precision accuracy to the shape of the tooth having the cavity which is to be filled, in order to assure that the gold inlay produced therefrom fits the tooth cavity in a perfect manner and will stay therein for many years. If the gold inlay does not fit the tooth cavity with precision accuracy, the inlay will either fall out, or additional decay of the tooth will develop along the marginal borderlines of the inlay, necessitating replacement with a larger inlay if the tooth still remains in repairable condition. In many cases, the resulting decay renders the tooth irrepairable, and necessitates its extraction.

Prior to the present invention, it was extremely difficult to obtain by electrodeposition a self-sustaining outer surface layer for the tooth die pattern, having an exterior shape conforming with precision accuracy to the tooth and its cavity. As a result, a great many tooth cavity inlays produced by available techniques fitted only loosely into the tooth cavity, and at times they were also distorted from their desired properly fitting shape. In most cases, the inlays were undersized by about .003 to .010 inch, or even more. Such trouble-breeding undersized inlays result indirectly from the fact that the outer tooth die pattern layer, obtained by the electrodeposition process, was also undersized because of the excessive thickness and non-uniformity of the metallic surface coating applied to the tooth impression on which the surface shell of the tooth die pattern had to be electrodeposited.

For making the metallic surface coating by the prior-art practice, a moisture coating having adherent properties is first applied to the cavity surface of the plastic tooth impression. A brush is then used for applying to the adherent moisture coating a copper or bronze powder, and an effort is made to distribute the metal powder uniformly over the entire moistened cavity surface of the plastic tooth impression, without damaging its shape. The adherent moisture composition used in such coating procedure comprised oils, glycerine, or the like. With such prior-art technique, it was extremely difficult to form an electro-conductive cavity coating of a thickness less than about .001 inch, and in many cases the thickness of the metallic base coating so formed, varied as much as up to .005 inch.

In instances where a graphite coating was applied to the interior cavity surface of such plastic tooth impression, similar difficulties are encountered. Thus, in using colloidal graphite as a coating substance, a quantity of water is admixed thereto in order to thin it and bring it to a form in which it may be applied by a brush as a thin coating to the interior cavity surface of the tooth impression. This results in a surface coating of graphite which is of objectionable thickness, and which makes it impossible to produce by the electrodeposition process the outer layer formation of a tooth die conforming accurately to the original tooth in all the details thereof. Graphite coating is also objectionable for practical reasons, because the exterior of the electro-formed shell formed therewith, is black.

As a result of extensive research, I have found that the foregoing difficulties may be overcome by using as a coating composition for metallizing the cavity surface of plastic tooth compositions, commercially available silver powders—of the type used for painting chinaware or the like—combined with a critical proportion of stearic acid into a dry silver coating powder; that such silver powder composition may be readily applied in dry form, with a fine-hair brush, such as a sable-hair brush, to the interior cavity surface of a plastic tooth impression to form thereon an electrically conductive surface metallic electrode coating of a thickness which is only a fraction of a thousandth of an inch, such as .00001 inch, or even less; and that such minutely thin silver coating of the invention makes possible the electrodeposition thereon of a relatively thick layer of metal such as copper, having an exterior shape conforming with precise accuracy to all details of the internal cavity surface of the plastic tooth impression. The commercially available silver powders suitable for the composition of the invention are usually composed of flake-like particles which will pass through a screen of from 250 to 500 mesh, and have a particle size of the order of several microns, which are so light that when stirred by a brush will float in the air.

To give the powder particles the desired characteristics which cause it to adhere in the form of a coating of minute thickness to the interior cavity surface of an impression, I found it essential to combine with it, stearic acid in a critical proportion between about 3% to 4.5% by weight. Such silver powder composition of the invention remains dry, and when stirred with a brush, will likewise float in the air.

Such silver powder combined with stearic acid in the critical proportions of the invention, greatly simplifies the process of forming a minutely thin, uniform electrode coating along the interior cavity surface of a plastic tooth impression. A brush is dipped in the dry silver powder composition and the brush with the silver powder thereon is applied to the cavity surface of the plastic tooth impression with a burnishing movement. A single application of such silver powder compound is sufficient to form on the entire interior cavity surface of a plastic tooth impression, a continuous electrically-conductive metallic coating that will operate as a very effective electrode base for building up thereon by electroformation a self-sustaining, shell-like metal layer of substantial thickness having an exterior shape conforming with precision accuracy to the intricate details of the cavity surface of the plastic tooth impression. The silver metal coating so formed is of such minute thickness that it is not visible when seen in cross-section. However, its light-reflecting properties make it visible along the surface of the plastic tooth impression to which it was applied.

An unskilled worker is able to perform such coating operation as long as he does not leave any surface portions of the cavity without a visible coating. In other words, once a visible coating is produced on the interior cavity surface of the impression, the coating will have the desired thickness and electrical conductivity required for depositing thereon a solid layer of metal by an electro-forming operation.

Such silver coatings may be readily produced with silver powder containing stearic acid in the proportion of 3.5% to 4.5% by weight, and also when the proportion of stearic acid is decreased to about 3%, or increased to about 4.5%. If the proportion of stearic acid is increased above 4.5% to about 5%, the silver powder composition becomes quite pasty and cannot be applied as readily in an extremely thin layer to the cavity surface of a plastic impression so as to leave thereon a substantially uniform thin coating of the silver powder. If the proportion of the stearic acid in the silver powder is reduced from 3% to about 2.5%, the silver powder will not as readily adhere to the cavity surface to which it is applied by a brush and much greater effort and care is required to deposit on the cavity surface of a plastic impression a coating covering all surface portions thereof with the minimum coating thickness for assuring a good electro-forming process in depositing thereon a metal layer of substantial thickness throughout the desired area thereof.

Fine silver powder produced by any known process may be readily combined with stearic acid in desired proportion. This may be done, for example, by the following procedure:

Stearic acid of the desired weight and proportion is dissolved in a suitable volatile organic liquid solvent such as mineral spirits, or other volatile petroleum product. Silver powder in the required proportion of weight is then added to the solution of stearic acid, and the stearic acid and the silver powder are intermixed while in the solution. Thereupon, the solvent is removed, as by evaporation under vacuum, leaving the silver powder combined and coated with the desired proportion of stearic acid, ready for use in accordance with the principles of the invention.

The dry silver powder composition of the invention will also form a very effective thin electrode-base coating if applied to the cavity surface of a plastic tooth impression of the type shown in Fig. 1 after first moistening it with a suitable moistening liquid, which does not detrimentally affect the impression compound and is not a solvent therefor. Pure alcohol having dissolved therein a minute fraction of stearic acid such as 5 to 12 grams stearic acid in 32 fluid ounces of alcohol is a satisfactory moistening liquid for this purpose.

According to a further phase of the invention, silver powder composition of the type described above, but combined with stearic acid in proportions within the range of about 5% to 7%, to form a silver powder paste, is suspended in a volatile organic solvent, which does not readily mix with the original solvent by which the stearic acid was originally combined with the silver powder, to produce a volatile liquid suspension of the silver powder composition containing 5% to 7% of stearic acid. According to the invention such liquid suspension holding suspended a silver powder composition containing about 5 to 7% stearic acid—when applied as with a brush, to the surface of an object—will form thereon a desired thin continuous electrode coating which is effective as a surface electrode for electro-forming thereon a strong metal object of desired special shape, such as the outer shell of a tooth die pattern, a specially shaped wave guide or the like. In particular I have found that when such silver powder is combined, in a mineral spirit solution, with stearic acid in a proportion between about 5% to 7%, it will, when dispersed in alcohol, form a liquid suspension of silver powder containing the previously added stearic acid and that such liquid powder suspension remains stable for the short time required for applying it as a coating to surfaces which are to be coated, such as a dental impression cavity surface. When such liquid silver powder suspension is applied with a brush to a surface to be coated, the silver powder composition will, after evaporation of the alcohol, form on the coated surface an extremely thin continuous silver coating having a thickness of only a fraction of a thousandth of an inch, such as .0005 to .0001 inch or even less, which forms a good electrode base for the electrodeposition process.

I have found that in making liquid suspensions of silver powder of the type described above, it is desirable to add a minute quantity of stearic acid to the alcohol before dispersing therein the silver powder composition containing 5% to 7% stearic acid. There will now be described one practical example of preparing a liquid suspension of such silver composition of the invention.

Silver powder is combined with 5% to 7% stearic acid in the manner described above in connection with the preparation of dry silver powder composition of the invention. A suspension liquid is prepared by dissolving in 100% pure alcohol stearic acid in the proportion of 32 fluid ounces of alcohol and 5 to 12 grams stearic acid. One part of the prepared silver powder composition is then placed in two parts of the alcohol solution, all parts by weight. By stirring the mixture of alcohol and silver powder composition, the silver particles will become dispersed in the liquid and remain suspended therein for a fairly long period, the powder settling gradually and remaining in partial suspension for a long time. Thus it will take several days before the silver powder composition will settle to the bottom of the container holding the liquid dispersion.

Such liquid dispersion of silver powder may be applied as a coating to cavity surfaces of an impression. In applying the liquid silver suspension to the surface, good results are obtained by proceeding as follows: After shaking the bottle so that some of the liquid suspension touches the inner surface of the bottle cap, the cap is removed with a thin deposit of the liquid powder suspension on its inner surface. The brush is applied with a mopping action to the inner surface of the bottle cap holding the liquid powder deposit, for picking it up therefrom. The brush holding the liquid powder deposit is then applied with a burnishing action to the cavity of the plastic impression which is to be coated with the powder, followed by a light retouching motion as part of a continuous, single operation, which in the case of most dental impresions requires not more than a few seconds. The deposited liquid evaporates at high rate leaving on the cavity surface of the impression a silver coating having a thickness of less than a fraction of a thousandth of an inch, such as .0005 to .0001 inch or even less.

I have found, also, that a fine silver powder of the type described above when combined with 5% to 7% of stearic acid in the manner described above, will form a silver powder paste which is of great practical value, for use as a metallizing composition and filler to fill in minute scratches or the like that at times require filling. Such silver powder paste permits ready filling and retouching of scratches in plastic tooth impressions or the like to give them a smooth surface required for producing therewith the desired strong electro-formed metal structure.

It will be apparent to those skilled in the art that the novel principles of the invention disclosed herein in connection with specific exemplifications thereof will suggest various other modifications and applications of the same. It is accordingly desired that in construing the breadth of the appended claims they shall not be limited to the specific exemplifications of the invention described herein.

I claim:

1. A coating composition for producing on the surface of an object of insulating material a continuous metallic electrode surface coating having a thickness of at most about 0.0003 inch which is effective as a surface electrode for electro-forming on such surface electrode a firm metallic structure having the shape of said electrode surface coating, which coating composition consists essentially of liquid absolute alcohol having suspended therein a powder composition consisting essentially of silver powder and about 5% to 7% stearic acid by weight, said silver powder having a particle size which floats in the air when stirred with a brush.

2. A coating composition for producing on the surface of an object of insulating material a continuous metallic electrode surface coating having a thickness of at most about 0.0003 inch which is effective as a surface electrode for electroforming on such surface electrode a firm metallic structure having the shape of said electrode surface coating, which coating composition consists essentially of liquid absolute alcohol having suspended therein a powder composition consisting essentially of silver powder and about 5% to 6% stearic acid by weight, said silver powder having a particle size which floats in the air when stirred with a brush.

References Cited in the file of this patent

UNITED STATES PATENTS

| Number | Name | Date |
|---|---|---|
| 2,080,346 | Tainton | May 11, 1937 |
| 2,240,300 | Hunter | Apr. 29, 1941 |
| 2,280,135 | Ward | Apr. 21, 1942 |
| 2,374,447 | Madison | Apr. 24, 1945 |
| 2,401,415 | Duggan | June 4, 1946 |
| 2,408,124 | Rolfes | Sept. 24, 1946 |
| 2,431,565 | Klock | Nov. 25, 1947 |
| 2,444,034 | Collings et al. | June 29, 1948 |